United States Patent [19]
Rhyne

[11] Patent Number: 6,010,456
[45] Date of Patent: *Jan. 4, 2000

[54] METHOD AND APPARATUS FOR ACOUSTIC SUBTRACTION IMAGING USING LINEAR AND NONLINEAR ULTRASONIC IMAGES

[75] Inventor: Theodore L. Rhyne, Whitefish Bay, Wis.

[73] Assignee: General Electric Company, Milwaukee, Wis.

[*] Notice: This patent issued on a continued prosecution application filed under 37 CFR 1.53(d), and is subject to the twenty year patent term provisions of 35 U.S.C. 154(a)(2).

[21] Appl. No.: 09/223,599

[22] Filed: Dec. 30, 1998

[51] Int. Cl.⁷ .................................................. A61B 8/00
[52] U.S. Cl. ............................................................. 600/447
[58] Field of Search .................................. 600/453, 443, 600/455, 454, 437, 441, 447; 128/916

[56] References Cited

U.S. PATENT DOCUMENTS

| | | | |
|---|---|---|---|
| 4,771,786 | 9/1988 | Iinuma | 128/660.06 |
| 5,485,842 | 1/1996 | Quistgaard | 600/443 |
| 5,544,659 | 8/1996 | Banjanin | 600/447 |
| 5,577,505 | 11/1996 | Brock-Fisher | 128/662.02 |
| 5,632,277 | 5/1997 | Chapman et al. | 128/660.07 |
| 5,706,819 | 1/1998 | Hwang et al. | 128/662.02 |
| 5,840,032 | 11/1998 | Hatfield et al. | 600/443 |

OTHER PUBLICATIONS

Fatemi et al., "Assessment of Tissue Nonlinearity Using 'Nonlinear Shadowing' Effect," IEEE Ultrason. Symp. 1995, pp. 1219–1223.

*Primary Examiner*—Scott M. Getzow
*Assistant Examiner*—Maulin Patel
*Attorney, Agent, or Firm*—Dennis M. Flaherty; Christian G. Cabou; Phyllis Y. Price

[57] ABSTRACT

A method and an apparatus for imaging a nonlinear signal component isolated from the echo signal derived from transmission of a base waveform having fundamental frequency $f_0$ and relatively high peak power. The nonlinear signal component is isolated by subtracting the linear signal component from the echo signal. This is accomplished using a second transmit firing derived from the same base waveform, but having different transmit characteristics, i.e., the base waveform is convolved with a code sequence to form a coded waveform. The coded waveform is transmitted at relatively low peak power. The beamsummed signal produced from the low-peak-power coded transmit is pulse compressed and then subtracted from the beamsummed signal produced from the high-peak-power uncoded transmit. The signals are scaled as necessary to achieve cancellation of the linear signal components when one beamsummed signal is subtracted from the other, leaving the nonlinear signal component for imaging.

31 Claims, 6 Drawing Sheets

METHOD AND APPARATUS FOR ACOUSTIC SUBTRACTION IMAGING USING LINEAR AND NONLINEAR ULTRASONIC IMAGES

FIELD OF THE INVENTION

This invention generally relates to ultrasound imaging of the human anatomy for the purpose of medical diagnosis. In particular, the invention relates to methods and apparatus for imaging ultrasound echo components arising from nonlinear propagation and scattering in tissue or contrast agents in blood.

BACKGROUND OF THE INVENTION

Conventional ultrasound scanners create two-dimensional B-mode images of tissue in which the brightness of a pixel is based on the intensity of the echo return. Alternatively, in a color flow imaging mode, the movement of fluid (e.g., blood) or tissue can be imaged. Measurement of blood flow in the heart and vessels using the Doppler effect is well known. The frequency shift of backscattered ultrasound waves may be used to measure the velocity of the backscatterers from tissue or blood. The Doppler shift may be displayed using different colors to represent speed and direction of flow. In power Doppler imaging, the power contained in the returned Doppler signal is displayed.

Conventional ultrasound transducers transmit a broadband signal centered at a fundamental frequency $f_0$, which is applied separately to each transducer element making up the transmit aperture by a respective pulser. The pulsers are activated with time delays that produce the desired focusing of the transmit beam at a particular transmit focal position. As the transmit beam propagates through tissue, echoes are created when the ultrasound wave is scattered or reflected off of the boundaries between regions of different density. The transducer array is used to transduce these ultrasound echoes into electrical signals, which are processed to produce an image of the tissue. These ultrasound images are formed from a combination of fundamental (linear) and harmonic (nonlinear) signal components, the latter of which are generated in nonlinear media such as tissue or a blood stream containing contrast agents. With scattering of linear signals, the received signal is a time-shifted, amplitude-scaled version of the transmitted signal. This is not true for acoustic media which propagate ultrasound in a nonlinear manner.

The echoes from a high-level signal transmission will contain both linear and nonlinear signal components. Conventional imaging systems produce waves well above the 200 kPa level at which nonlinear phenomena begin to appear. In fact, pressure fields on the order of several MPa are not unusual.

There are a number of classical acoustic phenomena that are either non-reciprocal or nonlinear. In the non-reciprocal category are phenomena such as: mode conversions from compression waves to shear waves, mode conversion to harmonic motions, total internal reflection along boundaries (exceeding Bruster's angle), and simple refractive bending of ray paths, plus other similar phenomena. In the nonlinear category are a great many things. The generation of second harmonics by free bubbles is well documented, as indicated above. Also, various contrast agents incorporating shell-encased gas or other materials are designed to produce harmonic and/or subharmonic returned echoes.

A great many components of the media should become nonlinear as the wave intensity is increased to the point that the molecular "spring constants" begin to exceed their linear or small signal range. Any nonlinearity in the media should cause a very rich form of harmonic generation, and not just the second harmonic variety. It is well-established that high-intensity ultrasonic waves become progressively more nonlinear as they propagate through tissue. In the theory of nonlinear circuits, the signals are expressed as an infinite sum of signal components. The first term in this sum is the linear term and the higher-order terms represent signals whose spectra are multiple convolutions (in frequency) of the original spectrum. This means that much more spectral energy than only the second harmonic is created. These extra spectral components can coexist with the original band as well as be out of the band.

In certain instances ultrasound images may be improved by suppressing the fundamental and emphasizing the harmonic (nonlinear) signal components. If the transmitted center frequency is at $f_0$, then tissue/contrast nonlinearities will generate harmonics at $kf_0$, where k is an integer greater than or equal to 2. Imaging of harmonic signals has been performed by transmitting a narrowband signal at frequency $f_0$ and receiving at a band centered at frequency $2f_0$ (second harmonic) followed by receive signal processing.

A nonlinear imaging system using phase inversion subtraction is disclosed in U.S. Pat. No. 5,632,277 to Chapman et al. First and second ultrasound pulses are transmitted into the specimen being imaged in sequence and the resulting receive signals are summed. The first and second pulses differ in phase by 180°. If the ultrasound waves undergo nonlinear propagation or nonlinear interaction with contrast agents or other nonlinear scattering media, then the returned signal will have both linear and nonlinear components. Upon summation, the linear components will cancel, leaving only the nonlinear components to be imaged.

There is a need for an alternative method of isolating the nonlinear components of the echo signals for use in both non-contrast and contrast harmonic imaging.

SUMMARY OF THE INVENTION

The present invention is a method and an apparatus for imaging a nonlinear signal component isolated from the echo signal derived from transmission of a base waveform having fundamental frequency $f_0$. The nonlinear signal component is isolated by subtracting the linear signal component from the echo signal. In the preferred embodiment, this is done at the beamformer output, which can be either an RF signal or its I/Q components.

Isolation of the nonlinear signal component is accomplished by processing the echo signals from a pair of transmit firings which are derived from the same base waveform, but have different transmit characteristics. For one transmit firing, the base waveform (i.e., one pulse) is transmitted with a relatively high peak power. A full-strength transmitted pulse excites the nonlinear mechanisms of the media. Therefore the returning echoes contain a linear component and other nonlinear components, some of which are in-band and others of which are out-of-band. The first beamsummed receive signal resulting from this higher-peak-power firing is bandpass filtered to pass a band of frequencies which include both the fundamental and the second harmonic frequencies.

For the other transmit firing, a coded waveform is transmitted at relatively low peak power. If the intensity of the waveform is kept lower than the conventional 200-kPa level, then a linear image signal should be produced. One way this can be done and still have adequate signal-to-noise ratio is to use biphase-keyed waveforms, where the "keying" sequence is a suitable code. A base waveform is repeated N times with polarity reversals dictated by the code sequence. If the code is properly chosen, then the sequence of waveforms can be compressed or decoded back to a single copy of the original pulse (i.e., base waveform). This coded waveform can be transmitted at low acoustic pressures so as to maintain the linearity of the receive signals. On receive, the second beamsummed receive signal resulting from the coded transmit waveform undergoes pulse compression and is then passed through the same bandpass filter used to filter the first beamsummed receive signal.

The use of coded excitation with a single code on transmit allows a long transmit waveform (i.e., multiple coded pulses) to be compressed on receive such that the energy is concentrated in a short interval. The basic concept involves modulating a specially designed biphase code sequence based on a transmit burst (e.g., base sequence) of length P. The frequency of the transmit burst is typically in the megahertz range. A coded pulse sequence of n bursts is often referred to as an n-chip code. The coded pulse sequence, which has a length n×P, enables a larger acoustic dosage or a shorter base sequence to be used to interrogate the target. The output from the beamformer is compressed in time by passing it through a decoding finite impulse response (FIR) filter. The output of the decoding (i.e., compression) filter is a compressed signal pulse of length equal or close to the original transmit burst length P, but whose amplitude n is that produced by the n-times-longer coded pulse sequence.

In accordance with the invention, the nonlinear signal component in the first beamsummed receive signal is then isolated by taking the coherent difference between the first beamsummed receive signal and the pulse-compressed version of the second beamsummed receive signal, with suitable scaling of the latter to ensure that the linear signal components will substantially cancel. This process, hereinafter referred to as "acoustic subtraction imaging", is repeated for each transmit focal zone, creating an image frame substantially made up of the nonlinear signal components. Any finite acoustic subtraction image is due to nonlinear actions in the media.

In accordance with the broad concept of the invention, the signal components being subtracted may be either RF signals or their I/Q components. The I/Q components are typically formed by baseband synchronous demodulation of the RF signal. In the preferred embodiment of the invention, the beamformer output is decoded and then demodulated. If demodulation precedes decoding, then the decoding filter must be designed to compress the demodulated signal.

The difference image produced by the acoustic subtraction imaging method of the present invention will contain substantially only the nonlinear image components of the echo signal produced by the higher-peak-power transmit. The spectral band of the difference image will be the nominal bandpass of the normal image as well as the higher harmonic spectral components. The self-interference by non-ideal spectral components of the transmitter spectrum should subtract out as well. It is possible to emphasize any part of the spectrum, including just the higher harmonic bands.

DETAILED DESCRIPTION OF THE PREFERRED EMBODIMENTS

Figure 1:
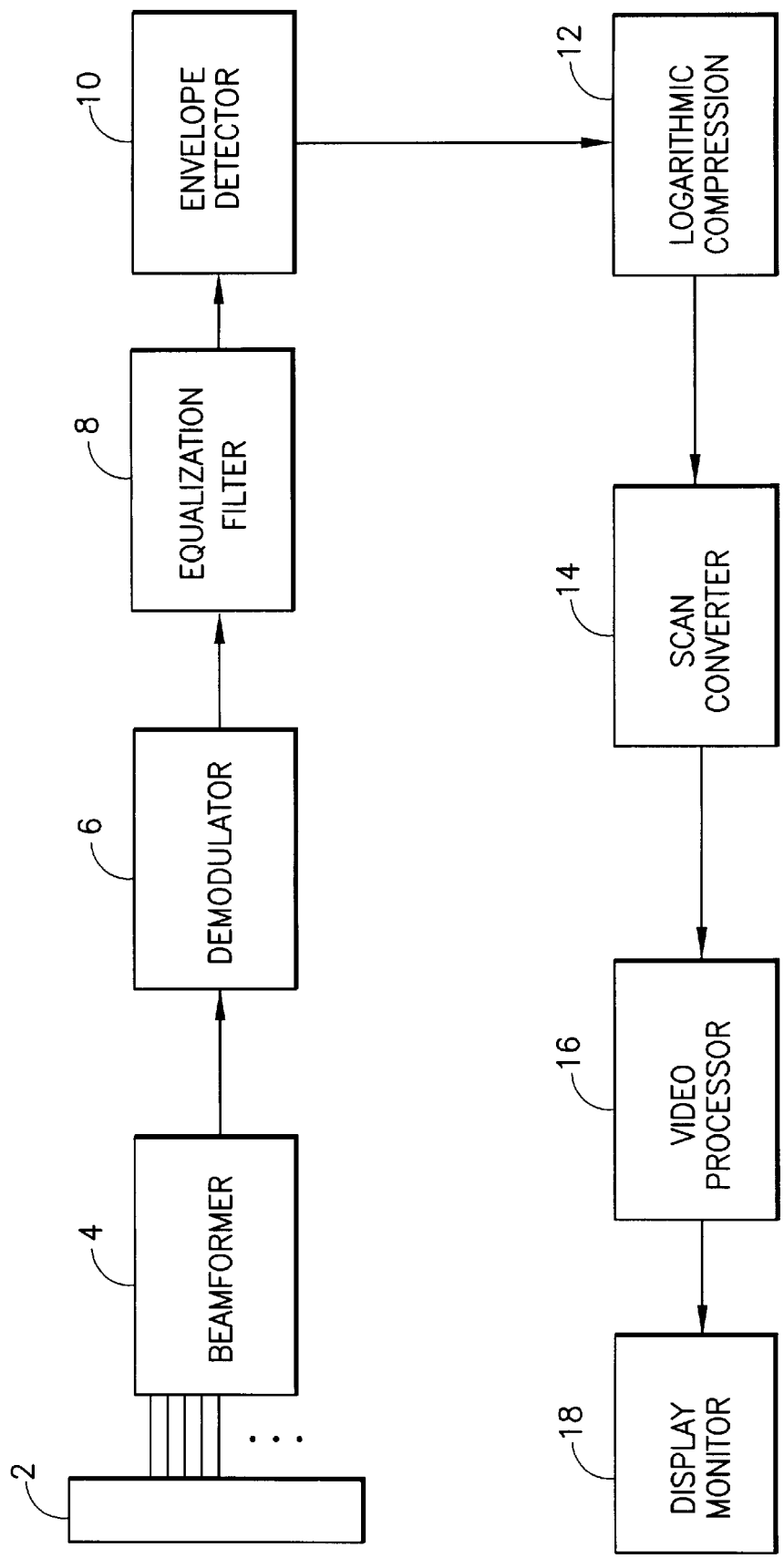
FIG. 1 is a block diagram showing the signal processing chain for a conventional ultrasound imaging system.

In a conventional ultrasound imaging system (shown in FIG. 1), an ultrasound transducer array 2 is activated to transmit a series of base waveforms which are focused at the same transmit focal position with the same transmit characteristics. Each transmit beam propagates through the object being scanned and is reflected by ultrasound scatterers in the object.

After each transmit firing, the echo signals detected by the transducer array elements are fed to respective receive channels of the beamformer 4. The receive beamformer tracks echoes under the direction of a master controller (not shown in FIG. 1). The receive beamformer imparts the proper receive focus time delays to the received echo signal and sums them to provide an echo signal which accurately indicates the total ultrasonic energy reflected from a succession of ranges corresponding to a particular transmit focal position.

In one conventional system, the frequencies of the beamformer outputs are shifted to baseband by a demodulator 6. One way of achieving this is to multiply the input RF signal by a complex sinusoidal $e^{i2\pi f_d 1}$, where $f_d$ is the frequency shift required. The beamsummed and demodulated signal is then bandpass filtered by an equalization filter 8 which is programmed with a set of filter coefficients to pass a band of frequencies centered at the fundamental frequency $f_0$ of the base waveform.

The I/Q components are then sent to a B-mode processor which incorporates an envelope detector 10 for forming the envelope of the beamsummed receive signal by computing the quantity $(I^2+Q^2)^{1/2}$. The envelope of the signal undergoes some additional B-mode processing, such as logarithmic compression (block 12 in FIG. 1), to form display data which is output to a scan converter 14.

In general, the display data is converted by the scan converter 14 into X-Y format for video display. The scan-converted frames are passed to a video processor 16, which maps the video data to a gray scale or mapping for video display. The gray scale image frames are then sent to the video monitor 18 for display. The images displayed by the video monitor 18 are produced from an image frame of data in which each datum indicates the intensity or brightness of a respective pixel in the display. An image frame may, e.g., comprise a 256×256 data array in which each intensity datum is an 8-bit binary number that indicates pixel brightness. The brightness of each pixel on the display monitor 18 is continuously refreshed by reading the value of its corresponding element in the data array in a well-known manner. Each pixel has an intensity value which is a function of the backscatter from a respective sample volume in response to interrogating ultrasonic pulses and the gray map employed.

In another conventional system, the RF signals are summed, equalized and envelope detected without intervening demodulation to baseband. To depict such a system, it is only necessary to remove block 6 from FIG. 1 and connect the output of the beamformer 4 to the input of the equalization filter 8. It should be appreciated that the invention can be employed in both RF and baseband systems.

In accordance with the present invention, a nonlinear signal component is imaged by isolating the nonlinear signal component from an echo signal derived from a first transmit firing of a base waveform having a fundamental frequency $f_0$ and a relatively high peak power. The nonlinear signal component is isolated by subtracting the linear signal component from the echo signal. This is accomplished using a second transmit firing derived from the same base waveform, but having different transmit characteristics, i.e., the base waveform is convolved with a code sequence to form a coded waveform. The coded waveform is transmitted at relatively low peak power. The beamsummed signal produced from the low-peak-power coded transmit is pulse compressed and then subtracted from the beamsummed receive signal produced from the high-peak-power uncoded transmit. The signals are scaled as necessary to achieve cancellation of the linear signal components when one beamsummed receive signal is subtracted from the other, leaving the nonlinear signal component for imaging.

Figure 2:
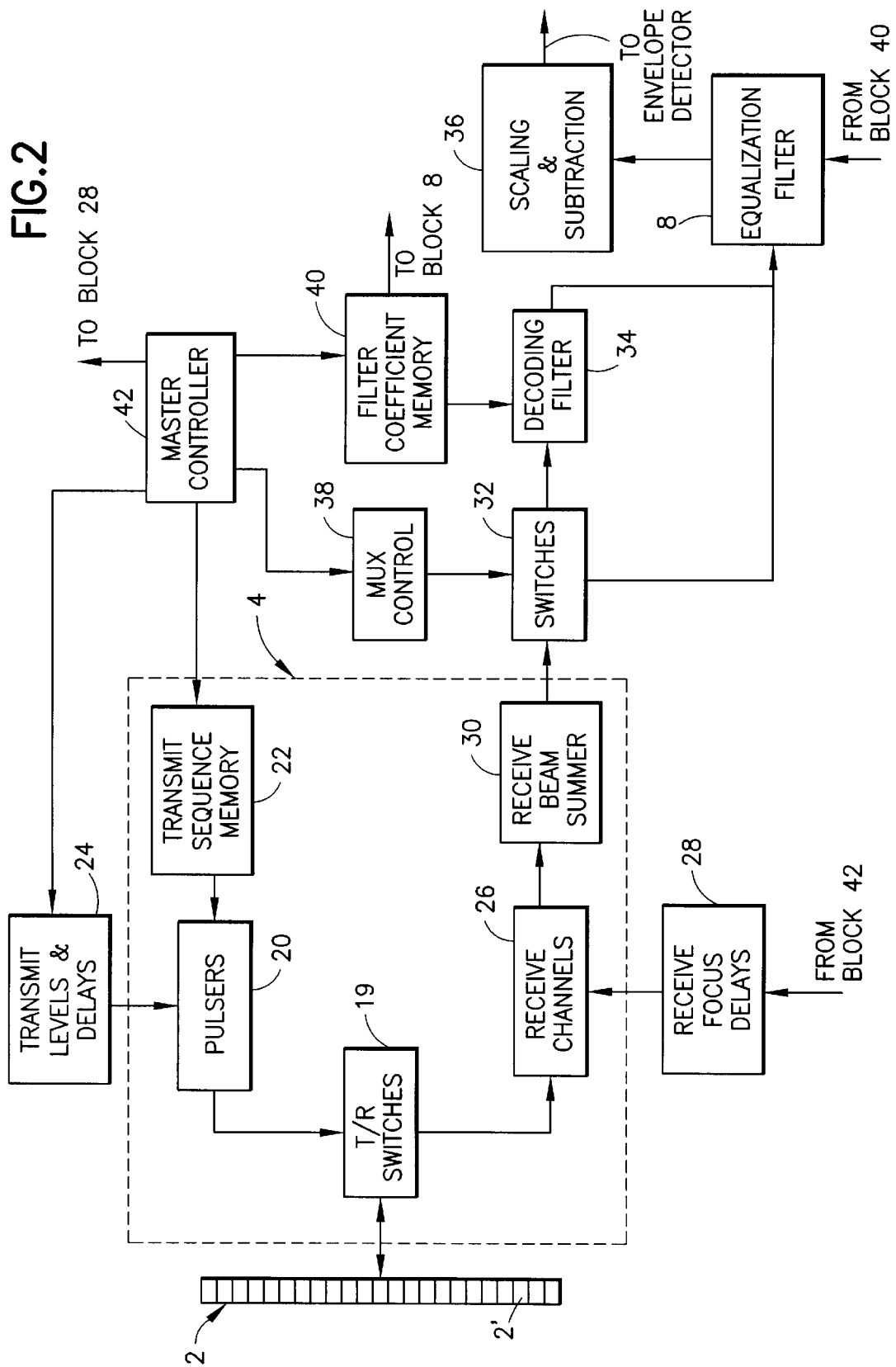
FIG. 2 is a block diagram showing the front end of an ultrasound imaging system in accordance with a preferred embodiment of the invention.

In accordance with a preferred embodiment shown in FIG. 2, for each transmit firing each transducer element 2' in the transmit aperture is pulsed with a waveform output by a respective pulser 20. The level and timing of the transmit waveform is provided by transmit level and timing circuit 24. In accordance with the present invention, there are two different transmit firings. The difference between the receive signals produced from these respective firings forms the acoustic subtraction image signal. One transmit firing is a relatively high-peak-power uncoded waveform derived from a base waveform having a predetermined fundamental frequency and the other transmit firing is a coded waveform of relatively low peak power having the same predetermined fundamental frequency. If the peak amplitude of the coded waveform is unity and the peak amplitude of the uncoded waveform is n, where n is a positive integer greater than unity, then the coded waveform will comprise n chips. The transmit waveforms are derived from respective binary transmit sequences stored in a transmit sequence memory 22. The coded transmit waveform is derived by convolving an n-digit transmit code (e.g., a Barker code) with the base waveform.

For the coded transmit firings, the pulsers 20 generate a coded pulse sequence in which the phase of pulses encoded with a +1 is 0°, while the phase of pulses encoded with a −1 is 180°. As used herein, the term "pulse" refers to the base waveform having a frequency $f_0$. The coded transmit sequence for controlling the phase of pulses output by each pulser 20 is stored in transmit sequence memory 22.

For both the coded and uncoded transmit firings, the pulsers 20 drive the elements 2' of transducer array 2 such that the ultrasonic energy produced is focused in a beam for each transmit firing. Transmit focus time delays are imparted to the respective pulsed waveforms output by the pulsers in response to the transmit sequence. By appropriately adjusting the transmit focus time delays in a conventional manner, the ultrasonic beams for the two firings can be focused at a desired transmit focal position. The signal level for the base (uncoded) waveform is maintained at a relatively high level, i.e., a level sufficient to produce an ultrasonic wave in excess of 200 kPa, whereas the signal level for the coded waveform is maintained at a relatively low level, i.e., a level sufficient to produce an ultrasonic wave less than 200 kPa. The base waveform and coded waveform are sent from the pulsers to the transducer elements via respective transmit/receive (T/R) switches 19. The T/R switches 19 are typically diodes which protect the receive electronics from the high voltages generated by the transmit electronics. The transmit signal causes the diodes to shut off or limit the signal to the receiver.

After each transmit, the transducer elements 2' are switched to receive mode to accept the returning echoes backscattered from the object being scanned. These return signals are fed to respective receive channels 26 of the receive beamformer, also via the T/R switches 19. The receive beamformer tracks echoes under the direction of master controller 42. The receive beamformer imparts the proper receive focus time delays 28 to the received RF echo signals and the beam summer 30 sums the RF echo signals for each firing to provide an echo signal which accurately indicates the total ultrasonic energy reflected from a succession of ranges corresponding to the particular transmit focal position.

Figure 3:
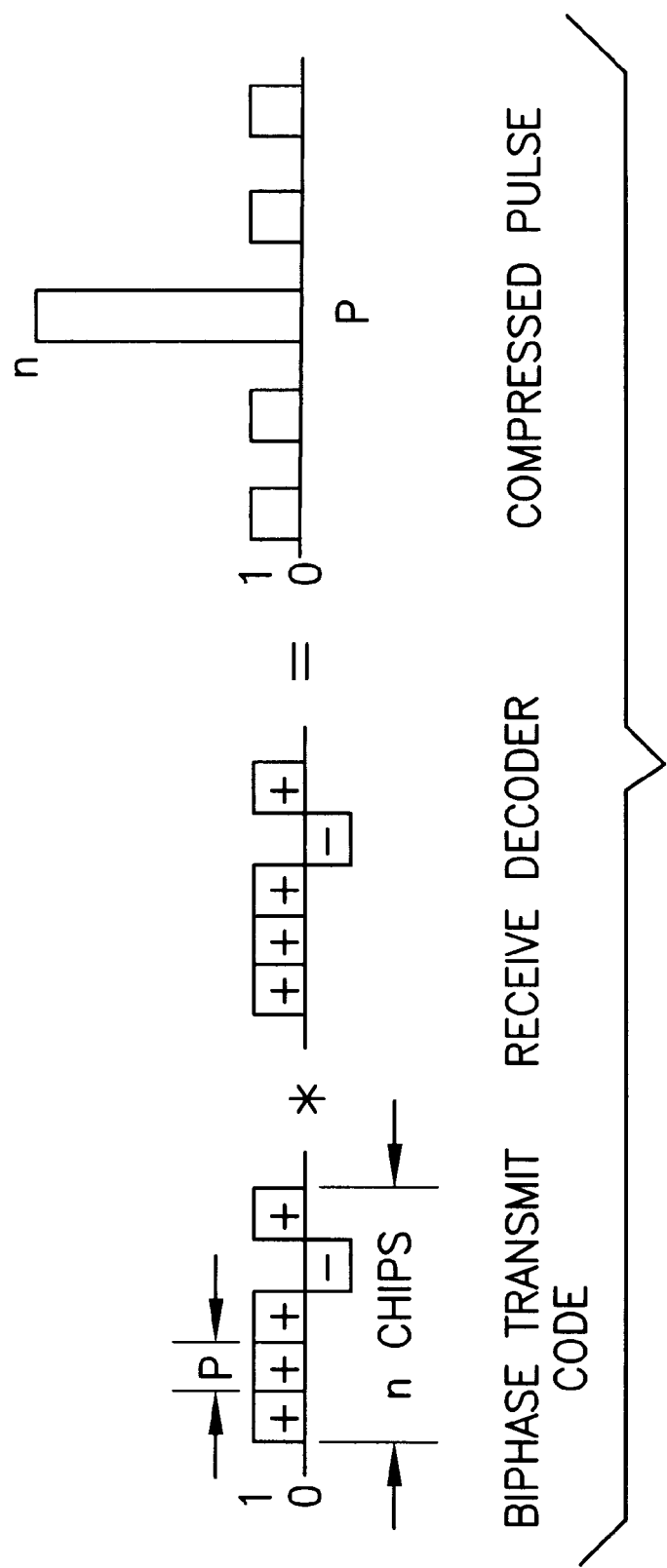
FIG. 3 is a schematic illustrating a compressed pulse resulting from correlation of a 5-bit biphase transmit code with matched filter coefficients of a decoding filter.

The output of the receive beamformer is connected to switches 32, which are operated to send the beamsummed receive signal for the uncoded transmit to the equalization filter 8 and to send the beamsummed receive signal for the coded transmit to the decoding filter 34. Preferably, switches 32 are incorporated in a multiplexer which receives switching state signals from a multiplexer controller 38, which in turn receives MUX State signals from the master controller 42. The output of the decoding (i.e., compression) filter 34 is a compressed signal pulse of length equal or close to the original transmit burst length, but whose amplitude n is that produced by the n-times-longer coded pulse sequence. One example of a compressed pulse is shown in FIG. 3. For an n-digit transmit code, the decoding filter 34 (see FIG. 2) is preferably an FIR filter having M filter taps (M≧n) for receiving a set of M filter coefficients from a filter coefficient memory 40. In accordance with a preferred embodiment, the filter coefficients $c_0, c_1, \ldots, c_{M-1}$ have scalar values which, when convolved with the n-digit transmit code, produce a compressed receive pulse sequence. The filter coefficients, like the transmit and receive time delays, the coded transmit sequences and the MUX State signals, can be supplied by the master controller 42.

The beamsummed receive signal produced by the uncoded transmit and the pulse-compressed signal output by the decoding filter are passed in succession through the equalization filter 8. In accordance with the preferred embodiments, the equalization filter is programmed, by inputting a set of filter coefficients from the filter coefficient memory 40, to pass a band of frequencies including the fundamental frequency $f_0$ and the second harmonic frequency $2f_0$. The filter 34 is preferably an FIR filter having M filter taps for receiving a set of M filter coefficients from the filter coefficient memory 40.

In accordance with the preferred embodiment shown in FIG. 2, the equalization filter 34 first outputs a filtered version of the beamsummed receive signal corresponding to the uncoded transmit and then outputs a filtered version of the pulse-compressed signal. Alternatively, the coded waveform can be transmitted before the uncoded waveform. In either case, the filtered signals are stored in a buffer memory and then the filtered pulse-compressed signal is scaled (if necessary) and then subtracted from the filtered signal corresponding to the uncoded transmit by scaling and subtraction means 36. The scaling and subtraction means 36 can be implemented in software or hardware at the equalization filter output. For example, means 36 may comprise a buffer memory and a scaling and subtraction routine carried out by the master controller 42. The scaling factor is selected so that the linear signal components in the respective filtered signals are substantially canceled by the subtraction operation. The remaining nonlinear signal components are output to the envelope detector for further processing in conventional fashion.

As an example of the coding technique employed in the present invention, FIG. 3 shows a 5-chip code sequence from the Barker code family. Barker codes are biphase (or binary) code sequences of various lengths up to n=13. [The set of all Barker codes is disclosed in an article by Welch et al. entitled "Sidelobe suppressed spread spectrum pulse compression for ultrasonic tissue imaging," IEEE Trans Ultrasonics, Ferroelec., and Freq. Control (accepted for publication, Aug. 1997).] If the 5-bit Barker code [1,1,1,-1,1] is decoded by a matching FIR filter (i.e., a filter having filter coefficients identical to the digits of the transmit code) as shown in FIG. 3, the compression ratio achieved is n=5, which corresponds to a SNR gain of 7 Db. However, as seen in FIG. 3, the main pulse in the decoder filter output is surrounded by pulses of smaller amplitude. These small-amplitude pulses correspond to axial or range sidelobes that are 1/n times lower in amplitude compared to the main lobe.

Another code which is suitable for use in the invention is the 7-bit Barker code [1,1,1,-1,-1,1,-1], which transmit code is convolved with a base waveform to produce the transmit coded waveform. The base waveform in this example is a two-cycle bipolar waveform having a center frequency of 5 MHz, which is sampled at 40 MHz, i.e., [1,1,1,1,-1,-1,-1,-1,1,1,1,1, -1,-1,-1,-1]. The full 7-chip transmit coded waveform is as follows:

[1, 1, 1, 1, -1, -1, -1, -1, 1, 1, 1, 1, -1, -1, -1, -1]
[1, 1, 1, 1, -1, -1, -1, -1, 1, 1, 1, 1, -1, -1, -1, -1]
[1, 1, 1, 1, -1, -1, -1, -1, 1, 1, 1, 1, -1, -1, -1, -1]
[-1, -1, -1, -1, 1, 1, 1, 1, -1, -1, -1, -1, 1, 1, 1, 1]
[-1, -1, -1, -1, 1, 1, 1, 1, -1, -1, -1, -1, 1, 1, 1, 1]
[1, 1, 1, 1, -1, -1, -1, -1, 1, 1, 1, 1, -1, -1, -1, -1]
[-1, -1, -1, -1, 1, 1, 1, 1, -1, -1, -1, -1, 1, 1, 1, 1]

Figure 4:
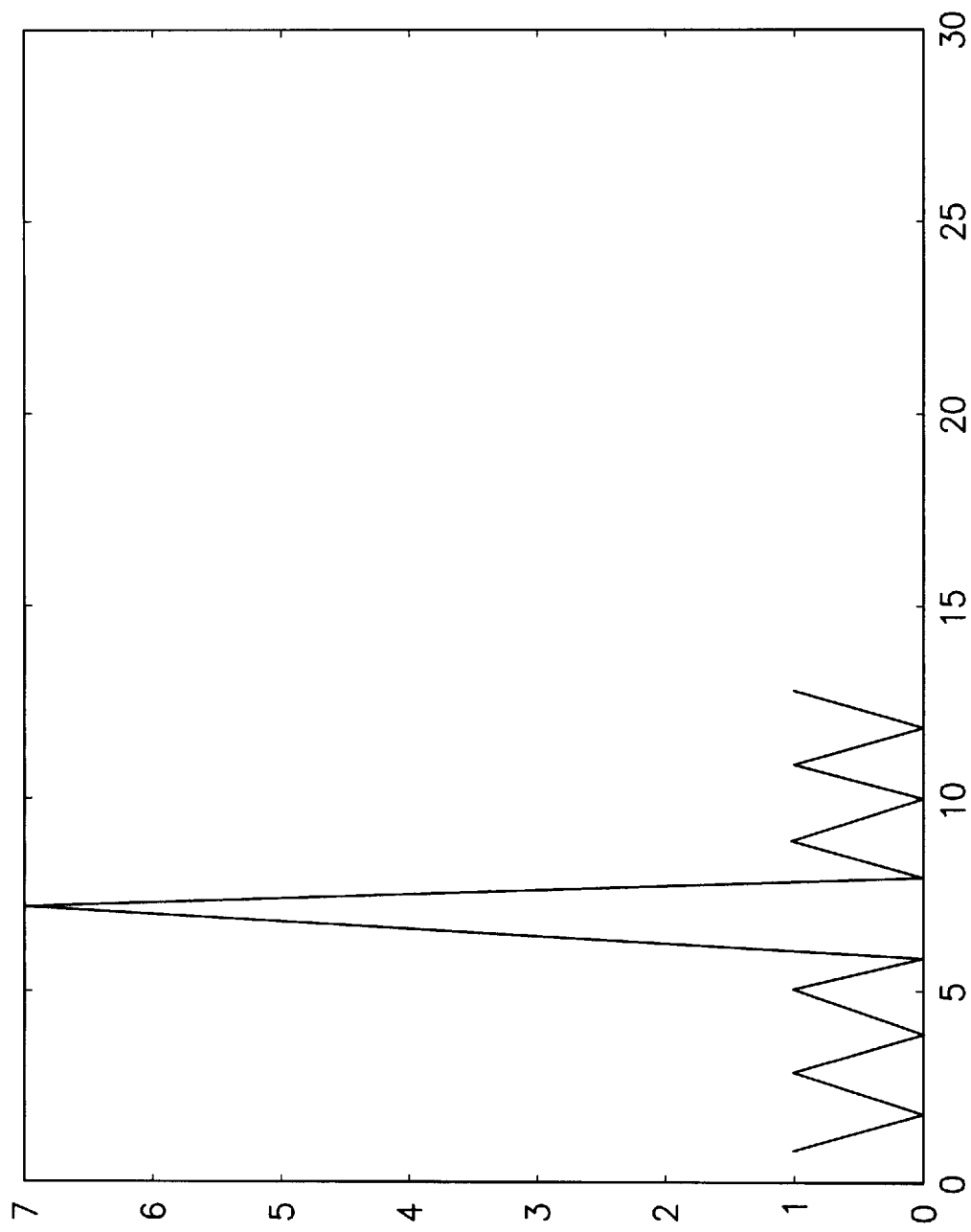
FIGS. 4 and 5 are graphs showing respective compressed pulses resulting from correlation of a 7-bit biphase transmit code with the filter coefficients of matching and mismatch filters respectively.

The decoding or autocorrelation is achieved on receive by the decoding filter. The appropriate decoding filter is designed based on the transmit code, the demodulation frequency (if decoding follows demodulation) and the amount of downsampling performed on receive. FIG. 4 shows the pulse compression effected using a decoding filter with filter coefficients that match the transmit code [1,1,1,-1,-1,1,-1]. The peak spike is at 7 and the sidelobes are at 1 (−17 dB down from the peak). Theoretically, the above waveform would transmit the energy of a 14-cycle 5-MHz waveform, but achieve the range resolution on receive of a 2-cycle 5-MHz base waveform (i.e., a 7-to-1 improvement in resolution).

Figure 5:
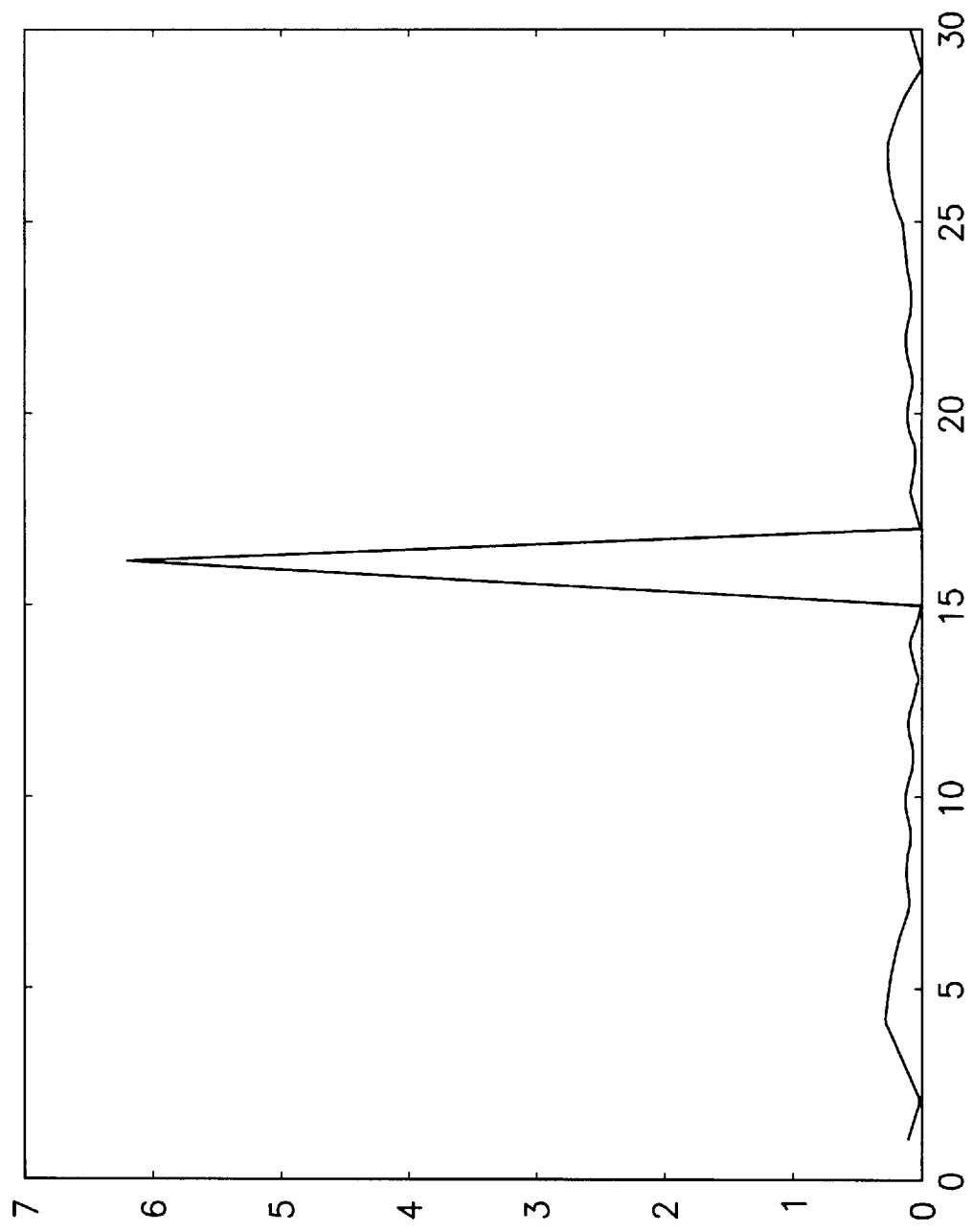

Among all biphase codes, Barker codes are well known for their property of having the smallest sidelobes possible when decoded by a matched filter. However, it should be noted that for any single transmit code, the sidelobes can often be suppressed via mismatched filtering at the expense of decreased signal gain and/or main lobe broadening (decreased range resolution). An example of a mismatched filter for the 7-bit Barker code [1,1,1,-1,-1,1,-1] is a 24-tap filter whose coefficients are as follows: [0.1001, −0.1084, 0.1488, −0.2186, 0.2994, −0.3219, 0.2524, −0.2186, 0.3898, −0.8812, 1.2050, −0.8265, −0.3764, 0.8265, 1.1992, 0.8812, 0.3800, 0.2186, 0.2294, 0.3219, 0.2765, 0.2186, 0.1266, 0.1084]. FIG. 5 shows convolution of the 7-bit Barker code with this 24-tap mismatched filter. The coefficients of this mismatched filter were determined using a well-known least squares technique [see, e.g., Robinson et al., Geophysical Signal Analysis, Englewood Cliffs, Prentice-Hall (1980)] to minimize the sidelobes while trying to preserve the peak spike. With this mismatch filtering technique, the sidelobes have been reduced another 10 dB (−27 dB below the peak), but with a loss in the peak level of about 1 dB. By using fewer or more taps for the mismatched filter, the sidelobes can be increased or decreased, resulting in a decrease or increase in peak signal loss. In general, greater sidelobe suppression can be achieved using longer mismatched FIR filters.

In accordance with the first preferred embodiment shown in FIG. 2, the nonlinear uncoded RF signal out of the beamformer is equalized whereas the linear coded RF signal out of the beamformer is pulse compressed and then equalized. The pulse-compressed and equalized linear signal is then scaled (if necessary) and subtracted from the equalized nonlinear signal. Since the decoding and equalization filtering are both linear time-invariant operations, it will be appreciated by persons skilled in the art that equalization filtering could be performed upstream of the switches 32, instead of at the location shown in FIG. 2.

Figure 6:
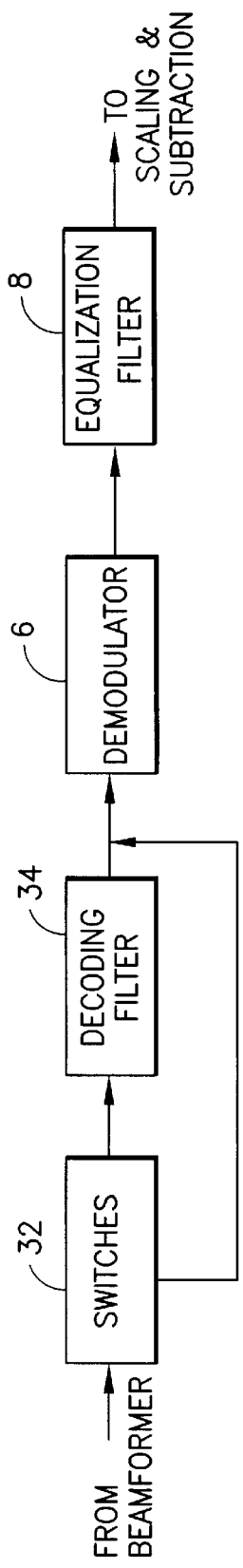
FIGS. 6 and 7 are block diagrams showing a portion of the front end of an ultrasound imaging system in accordance with alternative preferred embodiments of the invention.

In a second preferred embodiment shown in FIG. 6, the linear and nonlinear signals are demodulated by demodulator 6 after pulse compression and before equalization filtering. Because the demodulator is downstream of the decoding filter, the filter coefficients input into decoding filter 34 are the same as those employed in the embodiment shown in FIG. 2.

Figure 7:
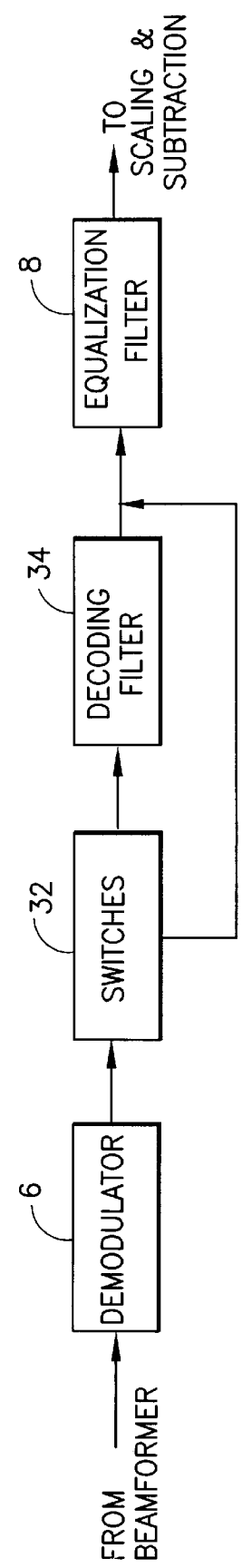

In a third preferred embodiment shown in FIG. 7, the linear and nonlinear signals are demodulated by demodulator 6 at a point upstream of the switches 32. The demodulator transforms the RF signals into their I/Q components. Although FIG. 7 depicts only one decoding filter and one equalization filter, it should be appreciated that each baseband component will preferably be filtered by respective decoding filters and respective equalization filters. The demodulated beamsummed receive signals corresponding to the uncoded transmit will be switched to the equalization filters, whereas the demodulated beamsummed receive signals corresponding to the coded transmit will be switched to the decoding filters. The decoding FIR filters can be implemented in software or hardware. The decoding filter coefficients must be matched or mismatched to the demodulated signals. For the case when the demodulator shifts by discrete frequencies $f_d = k/2t_b$, where k is any positive integer and $t_b$ is the duration of the transmit base waveform, the sinusoidal becomes real and the same set of filter coefficients are input to both decoding filters for the I and Q components, which thus form a real filter. For cases when $f_d \neq k/2t_b$, the I and Q decoding filters receive different sets of filter coefficients and thus form a complex filter. In the latter case, the filter coefficients are either matched or mismatched to the respective demodulated signal components.

Alternatively, acceptable sidelobe levels can be produced in response to the low-peak-power coded transmit using a complementary set of transmit codes, e.g., Golay codes. A set of complementary-coded waveforms produce signals which, after autocorrelation and summation, yield the original base waveform due to the fact that the sidelobe levels produced by the autocorrelation of one code sequence are equal in magnitude but opposite in sign to the those of the complementary sequence. This pulse-compressed receive signal is then subtracted from the receive signal produced in response to the relatively high-peak-power uncoded transmit.

In accordance with this alternative preferred embodiment, the coded low-level signal transmission may consist of two complementary-coded transmits. In this case, the decoding filter will comprise a correlation filter and a vector summer. The correlation filter is programmed with respective sets of filter coefficients (i.e., receive codes) corresponding to the complementary transmit codes. After the respective beamsummed receive signals are decoded, the filter outputs are summed in the vector summer to form the pulse-compressed signal.

The foregoing preferred embodiments have been disclosed for the purpose of illustration. Variations and modifications of the inventive concept will be readily apparent to persons skilled in the art. In particular, the coded transmit waveform may be amplitude-coded, rather than phase- or polarity-coded. In addition, polyphase codes can be used in place of biphase codes. All such variations and modifications are intended to be encompassed by the claims set forth hereinafter.

I claim:

1. A system for imaging ultrasound scatterers, comprising:
    an ultrasound transducer array comprising a multiplicity of transducer elements;
    a transmitter coupled to said transducer array and programmed to pulse selected transducer elements which form a transmit aperture with a base waveform having a first peak power level during a first transmit firing and a coded waveform having a second peak power level during a second transmit firing, said first and second transmit firings being focused at a transmit focal position, said first peak power level being greater than said second peak power level, and said coded waveform being a function of a transmit code convolved with said base waveform;
    a receiver coupled to said transducer array and programmed to receive first and second sets of signals from selected transducer elements which form a receive aperture subsequent to said first and second transmit firings respectively and output first and second beamsummed signals respectively derived from said first and second sets of signals;
    a switching arrangement having an input for receiving said first and second beamsummed signals and having first and second outputs, said switching arrangement passing said first beamsummed signal to said first output in a first state and passing said second beamsummed signal to said second output in a second state;
    a decoding filter having an input coupled to said second output of said switching arrangement and having an output, said decoding filter being programmed to output a pulse-compressed signal in response to input of said second beamsummed signal;
    a subtractor for subtracting a first signal derived from said pulse-compressed signal from a second signal derived from said first beamsummed signal to form a difference signal;
    a processor for forming an image signal derived from said difference signal; and
    a display device for displaying an image which is a function of said image signal.

2. The system as defined in claim 1, wherein said decoding filter is programmed with a set of filter coefficients which match said transmit code.

3. The system as defined in claim 1, wherein said decoding filter is programmed with a set of filter coefficients which are mismatched to said transmit code.

4. The system as defined in claim 1, wherein said first peak power level produces an ultrasonic wave having an acoustic pressure sufficiently strong to produce nonlinear waves and said second peak power level produces an ultrasonic wave having an acoustic pressure sufficiently weak to substantially remove all nonlinear waves.

5. The system as defined in claim 1, further comprising a bandpass filter for optimizing a characteristic of said first beamsummed signal and said pulse-compressed signal to form first and second bandpass-filtered signals respectively, said first bandpass-filtered signal forming said first signal.

6. The system as defined in claim 5, further comprising a scaler for applying a scaling factor to said second bandpass-filtered signal to form said second signal, wherein said scaling factor is selected to achieve substantial cancellation of the linear signal components in said first and second signals.

7. The system as defined in claim 1, further comprising:
    a demodulator for demodulating said first beamsummed signal and said pulse-compressed signal to form first and second demodulated signals respectively; and
    a bandpass filter for optimizing a characteristic of said first and second demodulated signals to form first and second bandpass-filtered signals respectively.

8. The system as defined in claim 7, further comprising a scaler for applying a scaling factor to said second bandpass-filtered signal to form said second signal, wherein said scaling factor is selected to achieve substantial cancellation of the linear signal components in said first and second signals.

9. The system as defined in claim 1, wherein said transmit code is a Barker code.

10. The system as defined in claim 1, wherein said transmit code is a biphase code.

11. A system for imaging ultrasound scatterers, comprising:
    an ultrasound transducer array comprising a multiplicity of transducer elements;
    a transmitter coupled to said transducer array and programmed to pulse selected transducer elements which form a transmit aperture with a base waveform having a first peak power level during a first transmit firing and a coded waveform having a second peak power level during a second transmit firing, said first and second transmit firings being focused at a transmit focal position, said first peak power level being greater than said second peak power level, and said coded waveform being a function of a transmit code convolved with said base waveform;
    a receiver coupled to said transducer array and programmed to receive first and second sets of signals from selected transducer elements which form a receive aperture subsequent to said first and second transmit firings respectively and output first and second beamsummed signals respectively derived from said first and second sets of signals;
    a demodulator for demodulating said first and second beamsummed signals to form first and second demodulated signals respectively;
    a switching arrangement having an input for receiving said first and second demodulated signals and having first and second outputs, said switching arrangement passing said first demodulated signal to said first output in a first state and passing said second demodulated signal to said second output in a second state;
    a decoding filter having an input coupled to said second output of said switching arrangement and having an output, said decoding filter being programmed to output a pulse-compressed signal in response to input of said second demodulated signal;
    a subtractor for subtracting a first signal derived from said pulse-compressed signal from a second signal derived from said first demodulated signal to form a difference signal;

a processor for forming an image signal derived from said difference signal; and a display device for displaying an image which is a function of said image signal.

12. The system as defined in claim 11, wherein said decoding filter is programmed with a set of filter coefficients which match a demodulated version of said transmit code.

13. The system as defined in claim 11, wherein said decoding filter is programmed with a set of filter coefficients which are mismatched to a demodulated version of said transmit code.

14. The system as defined in claim 11, wherein said first peak power level produces an ultrasonic wave having an acoustic pressure sufficiently strong to produce nonlinear waves and said second peak power level produces an ultrasonic wave having an acoustic pressure sufficiently weak to substantially remove all nonlinear waves.

15. A method for imaging ultrasound scatterers, comprising the steps of:

driving a first set of transducer elements forming a transmit aperture in a transducer array with a base waveform during a first transmit firing focused at a transmit focal position, said base waveform having a first peak power level;

receiving a first set of echo signals from a second set of transducer elements forming a receive aperture in the transducer array subsequent to said first transmit firing;

forming a first beamsummed signal derived from said first set of echo signals;

driving said first set of transducer elements with a coded waveform which is a function of a transmit code convolved with said base waveform during a second transmit firing focused at said transmit focal position, said coded waveform having a second peak power level less than said first peak power level;

receiving a second set of echo signals from said second set of transducer elements subsequent to said second transmit firing;

forming a second beamsummed signal derived from said second set of echo signals;

compressing said second beamsummed signal to form a pulse-compressed signal;

forming a first signal derived from said first beamsummed signal;

forming a second signal derived from said pulse-compressed signal;

subtracting said second signal from said first signal to form a difference signal;

forming an image signal derived from said difference signal; and displaying an image which is a function of said image signal.

16. The method as defined in claim 15, wherein said step of forming said first signal comprises the step of bandpass filtering said first beamsummed signal and said step of forming said second signal comprises the step of bandpass filtering said pulse-compressed signal, said bandpass filtering optimizing a characteristic of said first beamsummed signal and said pulse-compressed signal.

17. The method as defined in claim 16, wherein said step of forming said second signal further comprises the step of applying a scaling factor to said bandpass-filtered pulse-compressed signal, wherein said scaling factor is selected so that said subtraction step achieves substantial cancellation of the linear signal components in said first and second signals.

18. A method for imaging ultrasound scatterers, comprising the steps of:

driving a first set of transducer elements forming a transmit aperture in a transducer array with a base waveform during a first transmit firing focused at a transmit focal position, said base waveform having a first peak power level;

receiving a first set of echo signals from a second set of transducer elements forming a receive aperture in the transducer array subsequent to said first transmit firing;

forming a first beamsummed signal derived from said first set of echo signals;

demodulating said first beamsummed signal to form a first demodulated signal;

driving said first set of transducer elements with a coded waveform which is a function of a transmit code convolved with said base waveform during a second transmit firing focused at said transmit focal position, said coded waveform having a second peak power level less than said first peak power level;

receiving a second set of echo signals from said second set of transducer elements subsequent to said second transmit firing;

forming a second beamsummed signal derived from said second set of echo signals;

demodulating said second beamsummed signal to form a second demodulated signal;

compressing said second demodulated signal to form a pulse-compressed signal;

forming a first signal derived from said first demodulated signal;

forming a second signal derived from said pulse-compressed signal;

subtracting said second signal from said first signal to form a difference signal;

forming an image signal derived from said difference signal; and displaying an image which is a function of said image signal.

19. A system for imaging ultrasound scatterers, comprising:

an ultrasound transducer array comprising a multiplicity of transducer elements;

means for driving a first set of said transducer elements forming a transmit aperture in a transducer array with a base waveform during a first transmit firing and with a coded waveform which is a function of a transmit code convolved with said base waveform during a second transmit firing, said first and second transmit firings being focused at a transmit focal position, said base waveform having a first peak power level, and said coded waveform having a second peak power level less than said first peak power level;

means for receiving first and second sets of echo signals from a second set of transducer elements forming a receive aperture in said transducer array subsequent to said first and second transmit firings respectively;

means for beamforming first and second beamsummed signal derived from said first and second sets of echo signals respectively;

means for compressing said second beamsummed signal to form a pulse-compressed signal;

means for forming a first signal derived from said first beamsummed signal;

means for forming a second signal derived from said pulse-compressed signal;

means for subtracting said second signal from said first signal to form a difference signal;

means for forming an image signal derived from said difference signal;

a display monitor; and means for displaying an image which is a function of said image signal on said display monitor.

20. A method for producing scattered ultrasound in an object, comprising the steps of:

driving selected transducer elements of an ultrasonic transducer array to transmit a first beam focused at a transmit focal position in said object during a first transmit firing, said first beam being formed using a base waveform and having a first acoustic pressure; and driving said selected transducer elements to transmit a second beam focused at said transmit focal position in said object during a second transmit firing, said second beam being formed from a coded waveform and having a second acoustic pressure less than said first acoustic pressure, wherein said coded waveform corresponds to a convolution of a transmit code with said base waveform.

21. The method as defined in claim 20, wherein said first acoustic pressure is sufficiently strong to produce nonlinear waves and said second acoustic pressure is sufficiently weak to substantially remove all nonlinear waves.

22. The method as defined in claim 20, further comprising the step of injecting a contrast agent into said object prior to said driving steps.

23. A method for imaging ultrasound scatterers, comprising the steps of:

transmitting a first beam focused at a transmit focal position, said first beam being formed using a base waveform and having a first acoustic pressure;

detecting a first echo signal following scattering of said first beam by ultrasound scatterers at said transmit focal position;

transmitting a second beam focused at said transmit focal position, said second beam being formed from a coded waveform and having a second acoustic pressure less than said first acoustic pressure, wherein said coded waveform corresponds to a convolution of a transmit code with said base waveform;

detecting a second echo signal following scattering of said second beam by ultrasound scatterers at said transmit focal position;

compressing said second echo signal;

subtracting said compressed second echo signal from said first echo signal to form a difference signal; and displaying an image which is a function of said difference signal.

24. The method as defined in claim 23, further comprising the step of scaling said compressed second echo signal prior to said step of subtracting, the magnitude of said scaling being selected so that the linear signal components in said first echo signal and said scaled and compressed second echo signal are substantially canceled.

25. A system for imaging ultrasound scatterers, comprising:

means for transmitting a first beam focused at a transmit focal position, said first beam being formed using a base waveform and having a first acoustic pressure;

means for transmitting a second beam focused at said transmit focal position, said second beam being formed from a coded waveform and having a second acoustic pressure less than said first acoustic pressure, wherein said coded waveform corresponds to a convolution of a transmit code with said base waveform;

means for detecting first and second echo signals following scattering of said first and second beams respectively by ultrasound scatterers at said transmit focal position;

means for compressing said second echo signal;

means for subtracting said compressed second echo signal from said first echo signal to form a difference signal; and means for displaying an image which is a function of said difference signal.

26. The system as defined in claim 25, further comprising means for scaling said compressed second echo signal prior to subtracting, the magnitude of said scaling being selected so that the linear signal components in said first echo signal and said scaled and compressed second echo signal are substantially canceled.

27. A system for imaging ultrasound scatterers, comprising:

an ultrasound transducer array comprising a multiplicity of transducer elements;

a transmit beamformer operatively coupled to said transducer array in a transmit mode;

a receive beamformer operatively coupled to said transducer array in a receive mode;

a switching arrangement having an input operatively coupled to an output of said receive beamformer and having first and second outputs;

a decoding filter having an input operatively coupled to said second output of said switching arrangement;

a controller programmed and connected:

(a) to provide said transmit beamformer with transmit control data that causes said transducer array to transmit a first beam formed from a base waveform and having a first acoustic pressure during a first transmit firing and a second beam formed from a coded waveform and having a second acoustic pressure during a second transmit firing, said first and second beams being focused at a transmit focal position, said first acoustic pressure being greater than said second acoustic pressure, and said coded waveform being a function of a transmit code convolved with said base waveform;

(b) to provide said receive beamformer with receive control data that causes said receive beamformer to form first and second beamsummed signals from first and second sets of signals transduced by said transducer array following transmission of said first and second beams respectively;

(c) to provide said switching arrangement with switch control signals that cause said switching arrangement to pass said first beamsummed signal to said first output in a first state and pass said second beamsummed signal to said second output in a second state; and (d) to provide filter coefficients to said decoding filter which cause said decoding filter to compress said second beamsummed signal to form a pulse-compressed signal;

a subtractor for subtracting a first signal derived from said pulse-compressed signal from a second signal derived from said first beamsummed signal to form a difference signal;

a detector which forms an image signal derived from said difference signal; and a display subsystem for displaying an image which is a function of said image signal.

28. A system for imaging ultrasound scatterers, comprising:

an ultrasound transducer array comprising a multiplicity of transducer elements;

a display monitor for displaying an image which is a function of an image signal;

a computer programmed to perform the following steps:
(a) driving a first set of transducer elements forming a transmit aperture in a transducer array with a base waveform during a first transmit firing focused at a transmit focal position, said base waveform having a first peak power level;
(b) forming a first beamsummed signal derived from a first set of echo signals received by a second set of transducer elements forming a receive aperture in the transducer array in response to said first transmit firing;
(c) driving said first set of transducer elements with a coded waveform which is a function of a transmit code convolved with said base waveform during a second transmit firing focused at said transmit focal position, said coded waveform having a second peak power level less than said first peak power level;
(d) forming a second beamsummed signal derived from a second set of echo signals received by said second set of transducer elements in response to said second transmit firing;
(e) compressing said second beamsummed signal to form a pulse-compressed signal;
(f) forming a first signal derived from said pulse-compressed signal;
(g) forming a second signal derived from said first beamsummed signal;
(h) subtracting said first signal from said second signal to form a difference signal;
(i) forming an image signal derived from said difference signal; and
(j) displaying an image which is a function of said image signal on said display monitor.

29. The system as defined in claim 28, wherein said step of forming said first signal comprises the step of bandpass filtering said first beamsummed signal and said step of forming said second signal comprises the step of bandpass filtering said pulse-compressed signal, said bandpass filtering optimizing a characteristic of said first beamsummed signal and said pulse-compressed signal.

30. The system as defined in claim 29, wherein said step of forming said second signal further comprises the step of applying a scaling factor to said bandpass-filtered pulse-compressed signal, wherein said scaling factor is selected so that said subtraction step achieves substantial cancellation of the linear signal components in said first and second signals.

31. A system for imaging ultrasound scatterers, comprising:

an ultrasound transducer array comprising a multiplicity of transducer elements;

a transmitter coupled to said transducer array and programmed to pulse selected transducer elements which form a transmit aperture with a base waveform having a first peak power level during a first transmit firing and first and second complementary-coded waveforms having a second peak power level during second and third transmit firings, said first through third transmit firings being focused at a transmit focal position, said first peak power level being greater than said second peak power level, and said complementary-coded waveforms being a function of first and second complementary transmit codes respectively convolved with said base waveform;

a receiver coupled to said transducer array and programmed to receive first through third sets of signals from selected transducer elements which form a receive aperture subsequent to said first through third transmit firings respectively and output first through third beamsummed signals respectively derived from said first through third sets of signals;

a switching arrangement having an input for receiving said first through third beamsummed signals and having first and second outputs, said switching arrangement passing said first beamsummed signal to said first output in a first state and passing said second and third beamsummed signals to said second output in a second state;

a decoding filter having an input coupled to said second output of said switching arrangement and having an output, said decoding filter being programmed to output a pulse-compressed signal in response to input of said second and third beamsummed signals;

a subtractor for subtracting a first signal derived from said pulse-compressed signal from a second signal derived from said first beamsummed signal to form a difference signal;

a processor for forming an image signal derived from said difference signal; and a display device for displaying an image which is a function of said image signal.

* * * * *